Dec. 8, 1964  R. A. HARRIS ETAL  3,160,443
APPARATUS FOR PNEUMATICALLY CONVEYING ARTICLES
Filed Oct. 23, 1962  2 Sheets-Sheet 1

INVENTORS
R. A. HARRIS
W. R. WALTER JR.

BY R. P. Miller

ATTORNEY

INVENTORS
R.A. HARRIS
W.R. WALTER JR.
BY
ATTORNEY

United States Patent Office 3,160,443
Patented Dec. 8, 1964

3,160,443
APPARATUS FOR PNEUMATICALLY
CONVEYING ARTICLES
Richard A. Harris, High Point, and William R. Walter, Jr.,
Greensboro, N.C., assignors to Western Electric Company Incorporated, New York, N.Y., a corporation of
New York
Filed Oct. 23, 1962, Ser. No. 232,925
7 Claims. (Cl. 302—2)

This invention relates to an apparatus for pneumatically conveying articles and more particularly to an apparatus for conveying articles by pulsating blasts of compressed air.

In manufacturing operations, it is often necessary to convey articles or workpieces from one work station to another. More particularly, in pneumatically conveying relatively light articles which are fragile and of an irregular shape, difficulty is encountered in controlling the movement of the articles. Fragile and irregularly shaped articles are advantageously conveyed pneumatically, however, in prior art devices for pneumatically conveying articles or workpieces from one work station to another, a continuous flow of air has been utilized to lift or support the articles and to convey them along a straight line. The constant flow of air against the articles produces a constant force which in turn imparts a continuous acceleration to the articles. Due to the continuous acceleration of the articles, it is difficult to control the movement of the articles which results in jamming, breakage, and work stoppages. Further, as a continuous flow of air is used, a large supply of air is required, particularly where the air is used to lift and support the articles or workpieces as well as to convey them. Where the articles or workpieces are to be conveyed in a spaced relationship, additional inefficiency is introduced when a continuous flow of air is used as air will be expended in the spaced areas without actually contributing to the conveying of the articles or workpieces. Also, difficulty is encountered where it is necessary to convey articles or workpieces along a curved path. Due to the tendency of the articles to move in a straight line, the articles will tend to either leave the path or will congregate along the curves which produce undesirable work stoppages due to jamming and breakage.

Therefore, an object of the present invention is to provide a new and improved apparatus for pneumatically conveying articles.

It is a further object of the invention to provide facilities for applying pulsating blasts of air to a given load, thereby reducing the amount of air expended to convey the load from one point to another.

A further object is to provide instrumentalities for controlling the frequency at which blasts of air are pulsated, and the duration and strength of the blasts of air directed against articles, whereby the speed of the articles may be controlled and the articles may be conveyed without imparting a continuous acceleration.

Still another object of the invention is to provide a series of sequentially operated facilities which are staggered and oppositely disposed along a path for directing pulsating blasts of air against articles whereby the articles will be conveyed along the path in a spaced relationship so as to traverse curved or straight portions of the path without congregating along the path.

With these and other objects in view, the present invention contemplates a pneumatic conveying apparatus including an article-supporting member, a plurality of nozzles or vents arranged along opposite sides of the supporting member and valving facilities for pulsating blasts of air through the nozzles or vents for conveying the articles along the supporting member.

A complete understanding of this invention may be had by reference to the following detailed description when read in conjunction with the accompanying drawings illustrating preferred embodiments thereof, wherein.

Figure 4:
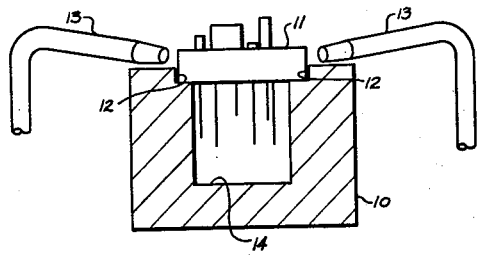
FIG. 4 is a cross-sectional view of FIG. 2 taken along the line 4—4 and showing an arrangement of an article-supporting facility for supporting and guiding articles along a path.

Referring now in detail to the drawing, and particularly to FIG. 4, there is shown a cross-sectional view of an article-supporting member 10. An article or workpiece 11 is supported in a trackway formed by notches or grooves 12 of the article-supporting member 10. Nozzles 13 are provided along opposite sides of the article-supporting member 10 to direct pulsating blasts of air against the articles to convey them along the article-supporting member 10. Article-supporting member 10 is provided with a slot or recessed portion 14 to accommodate irregularly shaped portions of the articles so that the articles may be conveyed without breaking or bending protruding portions of the articles. For example, it may be desirable to convey an article having electrical leads extending therefrom to a wire-wrapping station for connecting electrical components to the leads of the article. Further, by supporting the articles only along the smooth opposite sides, the frictional resistance to the movement of the article is reduced.

Figure 1:
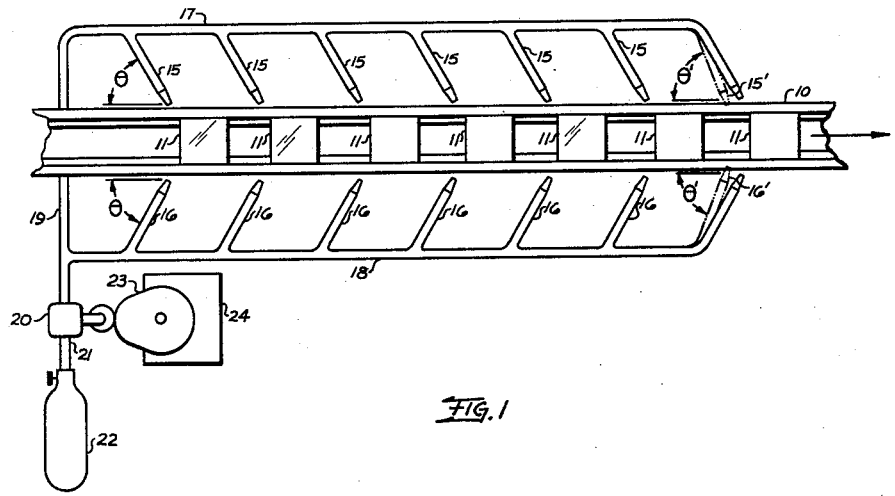
FIG. 1 is a schematic top view of an arrangement of simultaneously operated pulsating facilities for pneumatically conveying the articles in accordance with the invention.

In FIG. 1 there is shown a first embodiment of the invention. A plurality of nozzles or vents 15 are arranged along one side of the article-supporting member 10, and a plurality of nozzles or vents 16 are arranged on the opposite side of the article-supporting member 10. The nozzles 15 and 16 are positioned directly opposite each other, and are connected by compressed-air manifolds 17 and 18, respectively. Compressed-air manifolds 17 and 18 are joined together by conduit 19, which connects the nozzles 15 and 16 to a valve 20 which is provided with compressed air or other pressurized fluid through a conduit 21 from a compressed air or pressurized fluid source 22. The valve 20 is actuated by a cam 23, which in turn is driven by a motor 24. As the valve 20 is actuated, pulsating blasts of compressed air will exit simultaneously from nozzles 15 and 16 to convey the articles or workpieces 11 along the article-supporting member 10.

The frequency of the pulsating blasts of air can be controlled, for example, by varying the speed at which the cam 23 actuates valve 20. Further, by the proper choice of camming surfaces for cam 23, the duration of the pulsating blasts of air can be predetermined. The strength of the pulsating blasts of air may be readily adjusted by varying the pressure at which the compressed air is delivered to the valve 20.

The nozzles 15 and 16 are positioned at common acute angles θ relative to the article-supporting member 10. Therefore, the force exerted on the workpieces 11 by the pulsating blasts of air will have a vector component perpendicular to, and a vector component parallel to, the article-supporting member 10. As the nozzles 15 and 16 are directly opposite each other, the vector components perpendicular to the article-supporting member will cancel each other out when the workpieces are in the center of the article-supporting member 10. Therefore, the perpendicular components will center the workpieces on the article-supporting member thereby reducing the frictional forces between the guide and the article. The vector components parallel to the center line 24 are additive and will convey the workpieces 11 along the article-supporting member.

By properly selecting the frequency at which the valve 20 is actuated and by controlling the duration and strength of the blast of compressed air, the articles will be conveyed from one pair of nozzles to the next in uniform increments along member 10 so that the blasts of compressed air will exit from the nozzles 15 and 16 when the workpieces are in front of the nozzles.

In certain situations it may be desirable to slow down the article, for example, to perform a work operation on the moving article. This slowing down of the article may be also desirable when the article exits from the conveyor path. To accomplish a slowing down of the article, the acute angles of the opposed nozzles are increased to decrease the magnitudes of the effective force components along the path. This result is exemplified in FIG. 1 by arranging the last opposed pair of nozzles 15' and 16' at increased angles θ' whereupon the articles will be slowed as they exit from the conveyor.

Figure 2:
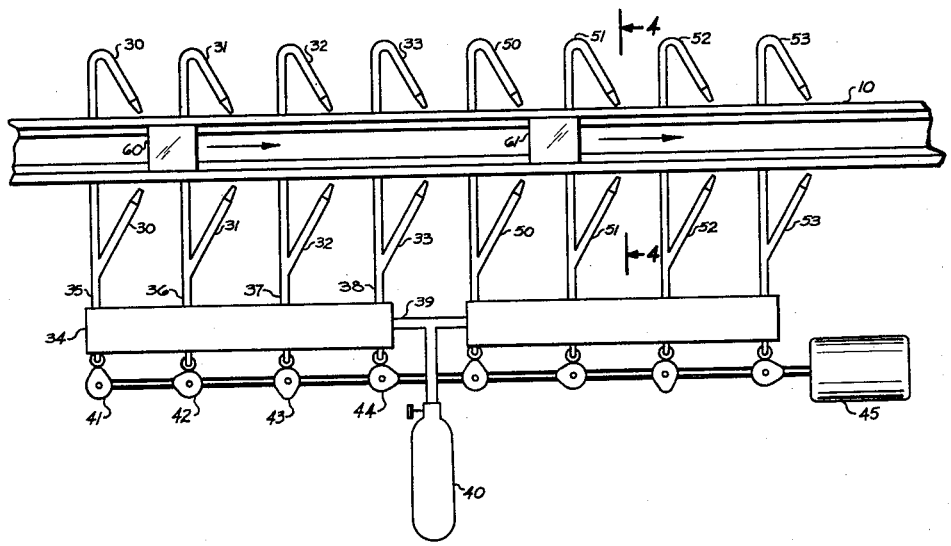
FIG. 2 is a schematic top view of an arrangement of sequentially operated pulsating facilities for pneumatically conveying the articles in accordance with the invention.

In FIG. 2, a second embodiment of the invention is shown, wherein the nozzles or vents are connected to a source of compressed air in opposed pairs. Opposing pairs of nozzles or vents 30, 31, 32, and 33 are connected to the valve 34 by conduits 35, 36, 37 and 38, respectively. The valve 34 is supplied with compressed air through conduit 39 from compressed air source 40. Compressed air is selectively delivered to nozzles 30, 31, 32 and 33 by cams 41, 42, 43 and 44 actuating the valve 34. Motors 45 is provided for actuating the cams 41, 42, 43 and 44. Therefore, the nozzles 30, 31, 32 and 33 may be operated in seriatim whereby a pulsating blast of air will travel along the length of the article-supporting member 10, thereby conveying workpieces 60. Nozzles 50, 51, 52 and 53 are also connected to the compressed air source 40 and are actuated in a like manner as the nozzles 30, 31, 32 and 33.

As in the first embodiment, the nozzles are positioned directly opposite each other whereby the workpieces 11 will be centered on the article-supporting member 10. Again, the angles of the nozzles may be varied to change the effective magnitude of the force components tending to advance the articles.

Workpiece 60 is conveyed from nozzles 30 to nozzles 31 as the workpiece 61 is conveyed from nozzles 50 to nozzles 51. The nozzles 30 and 50 are actuated simultaneously as are the nozzles 31 and 51, 32 and 52, and 33 and 53, thereby maintaining the same spacing between the articles as they are conveyed along the article-supporting member 10. Therefore, in this embodiment the workpieces are easily controlled without an appreciable increase in velocity when it is desirable to use a predetermined spacing between workpieces.

Figure 3:
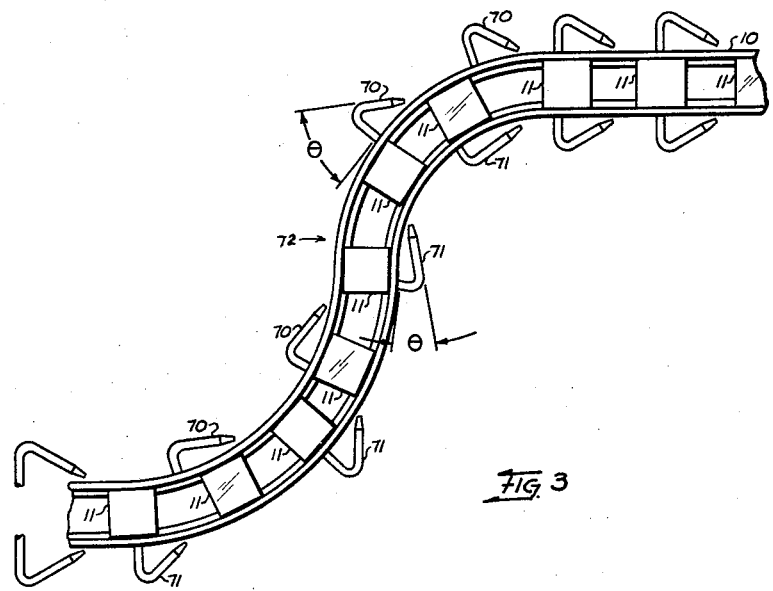
FIG. 3 is a schematic top view showing the nozzle arrangement along a curved portion of the article-supporting member for pneumatically conveying the articles in accordance with the invention.

As seen in FIG. 3, nozzles 70 are positioned on one side and nozzles 71 along the other side of a curved section 72 of the article-supporting member 10. The nozzles 70 and 71 are placed in a staggered relationship along the curved section 72, and are arranged at common acute angles θ relative to the curved section 72. Therefore, the pulsating blasts of air will produce forces having tangential components of the same magnitude. If it is desired to increase or decrease the force component acting to advancing the article, the angle θ of the nozzles may be decreased or increased. In situations where there are sharp angles of curvature, it is desirable to change the angle θ to increase the effective force component that acts on the article. Workpieces 11 on article-supporting member 10 are advanced by the tangential force components of the pulsating blasts of air from the nozzles 70 and 71.

It should be noted that the nozzles 70 and 71 may receive air pulsations either simultaneously or severally and may therefore be used with either of the embodiments of FIG. 1 or FIG. 2.

While various specific examples and embodiments of the invention have been described in detail hereinabove, it will be obvious that various modifications may be made from the specific details described without departing from the spirit and scope of the invention.

What is claimed is:

1. In a penumatic conveyor for advancing articles along a path,
   oppositely disposed pairs of nozzles positioned along the path at acute angles with respect to said path, and
   means for applying air pulses to said nozzles to advance articles positioned between the pairs of nozzles.

2. In a pneumatic conveyor for advancing articles along a path,
   oppositely disposed pairs of nozzles positioned along the path at common acute angles with respect to said path, and
   means for applying air pulses simultaneously to each of said nozzles to advance articles positioned between the pairs of nozzles.

3. In a pneumatic conveyor for advancing articles along a path,
   oppositely disposed pairs of nozzles positioned along the path at common acute angles with respect to said path,
   a source of compressed air connected to each of said nozzles,
   a valve connected between the source of compressed air and each of said nozzles, and
   means for sequentially actuating said valve to apply air pulses simultaneously to each of said nozzles to advance articles positioned between the pairs of nozzles.

4. In a pneumatic conveyor for advancing articles along a path,
   oppositely disposed pairs of nozzles positioned along the path at common acute angles with respect to said path,
   a source of compressed air connected to each pair of nozzles,
   valving means for separately applying air pulses to each pair of nozzles, and
   means for sequentially actuating said valving means in seriatim to advance articles positioned between one pair of nozzles to the next pair of nozzles in a spaced relationship.

5. In a pneumatic conveyor for advancing articles along an article-supporting member comprising,
   an article-supporting member having a longitudinal slot extending from the top surface for accommodating irregular portions of the articles and opposed longitudinal grooves extending from the slot for supporting opposed edges of articles,
   oppositely disposed pairs of nozzles positioned along said member at common acute angles with respect to said member for projecting air against articles supported in said grooves, and means for applying air pulses to said nozzles to advance articles positioned between the pairs of nozzles.

6. In a pneumatic conveyor for advancing articles along a path,
a track extending along said path,
means on said track for supporting articles on, and confining articles to, positions along the path,
a plurality of series of nozzles positioned along the path at acute angles thereto, and
means for sequentially applying air pulses to said nozzles in each series to advance articles positioned on said track along the path.

7. An apparatus for sequentially conveying an article along a track in controlled discrete steps which comprises:
a series of nozzles directed to produce a force component along the length of the track, and
means for intermittently passing fluid material through the series of nozzles to move an article in controlled discrete steps along the track.

References Cited in the file of this patent
UNITED STATES PATENTS

| | | |
|---|---|---|
| 1,308,464 | Westly | July 1, 1919 |
| 2,342,680 | Melzer | Feb. 29, 1944 |
| 3,042,199 | Welchman | July 3, 1962 |